(12) United States Patent
Yu

(10) Patent No.: US 10,771,915 B2
(45) Date of Patent: Sep. 8, 2020

(54) CAR STEREO AUDIO EXPANDING METHOD

(71) Applicant: Huizhou Desay SV Automotive Co., Ltd., Guangdong (CN)

(72) Inventor: Huixiong Yu, Guangdong (CN)

( * ) Notice: Subject to any disclaimer, the term of this patent is extended or adjusted under 35 U.S.C. 154(b) by 0 days.

(21) Appl. No.: 16/614,371

(22) PCT Filed: Dec. 25, 2017

(86) PCT No.: PCT/CN2017/118383
§ 371 (c)(1),
(2) Date: Nov. 18, 2019

(87) PCT Pub. No.: WO2019/061901
PCT Pub. Date: Apr. 4, 2019

(65) Prior Publication Data
US 2020/0084568 A1 Mar. 12, 2020

(30) Foreign Application Priority Data

Sep. 30, 2017 (CN) .......................... 2017 1 0914943

(51) Int. Cl.
| | |
|---|---|
| *H04S 7/00* | (2006.01) |
| *B60R 11/02* | (2006.01) |
| *H04R 3/04* | (2006.01) |
| *H04R 3/12* | (2006.01) |
| *H04R 5/02* | (2006.01) |
| *H04R 5/04* | (2006.01) |
| *H04S 1/00* | (2006.01) |

(52) U.S. Cl.
CPC .......... *H04S 7/307* (2013.01); *B60R 11/0217* (2013.01); *H04R 3/04* (2013.01); *H04R 3/12* (2013.01); *H04R 5/02* (2013.01); *H04R 5/04* (2013.01); *H04S 1/002* (2013.01); *H04R 2499/13* (2013.01)

(58) Field of Classification Search
CPC ..... H04S 7/307; H04S 1/002; B60R 11/0217; H04R 3/04; H04R 3/12; H04R 5/02; H04R 5/04; H04R 2499/13
USPC .................................. 381/86, 302, 71.4, 300
See application file for complete search history.

(56) References Cited

U.S. PATENT DOCUMENTS

2008/0273722 A1* 11/2008 Aylward .................. H04R 5/02
381/302

FOREIGN PATENT DOCUMENTS

EP            2023672    *   2/2009

\* cited by examiner

*Primary Examiner* — Norman Yu
(74) *Attorney, Agent, or Firm* — Prakash Nama; Global IP Services, PLLC

(57) ABSTRACT

The present invention relates to the technical field of a car stereo audio expanding method. The method performs delay processing on sound channel signals in a loudspeaker twice to counteract signals reflected by door glass, such that the sound field performs better. The sound field processing method of the present invention can enable the sound field of sounds heard by the driver to be centered and the diffusion of both sides to be symmetric. Also the sound field can be expanded to the outside of the vehicle, resolving the problem that the car audio, in a car environment, has a sound field weighted toward one side, has a narrow sound field width, and has poor hearing effects due to the confined sound field. The invention enables sound heard to be authentic rather than empty.

11 Claims, 2 Drawing Sheets

CAR STEREO AUDIO EXPANDING METHOD

BACKGROUND OF THE INVENTION

The present invention relates to the technical field of stereo, in particular, to a car stereo audio expanding method.

Typically, the stereo requires a pair of audios, and the distance between the audios is greater than 1 meter to be placed in front of the listener. The listener forms an equilateral triangle with the two audios, so as to establish a good effect and present a normal sound field. A good sound field performance can bring satisfaction.

Nowadays, the stereo expanding technology is based on a symmetrical listening environment that has a positive effect for TVs, computers and portable devices. However, the use environment of a car is not considered, and the application effect for the car is not good. For the reproduction of sound field of a car in the car audio, the sound field that should be is difficult to display due to the particularity of the car environment. Since the seat of the car is biased to one side, the distance between the listener and the left and right loudspeakers in the car environment is asymmetrical, and the listening angles of the left and right sides of the listener are several times different. Further, since there are many glass windows and the hardness of the glass is large, the sound is almost totally reflected, and the reflected sound is strong, so that the display of the sound field is affected.

For example, in the driving position (FIG. 1), the sound from the left loudspeaker has a direct sound Ld to the left ear of the driver, and a reflected sound Lr1+Lr2 reflected by the passengers door glass to the right ear of the driver. Similarly, the sound from the right loudspeaker has a direct sound Ld to the right ear of the driver and also a reflected sound Rr1+Rr2 reflected by the driver's door glass to the left ear. Since the direct sound is not far from the reflected sound, the difference in their sound is not so great that it seriously affects the display of the sound field.

The existing solution is to adding a delay on, the left sound channel to center the sound listened by the driver, and to confine the sound field within the front windshield. Although the existing stereo expanding technique can expand the sound to some extent, there will be some illusory and unreal feeling. And the known technique is to solve the problem of the asymmetry of the listening environment in the car by using the delay, but it does not solve the problem of the reflected sound of the door glass.

BRIEF SUMMARY OF THE INVENTION

In order to overcome above defects of the prior art, the present invention provides a car stereo audio expanding method.

In order to solve the said technical problem, the present invention uses the following technical solutions:

A car stereo audio expanding method comprises steps of:

S10, performing different degrees of first delay processing on a first sound channel signal output to a first loudspeaker near a driving seat and a second sound channel signal output to a second loudspeaker far from the driving seat according to a relative position;

S20, outputting the first sound channel signal processed by the first delay to a first sound mixer, and performing a second delay processing on the first sound channel signal according to a relative position and outputting to a second sound mixer; outputting the second sound channel signal processed by the first delay to the second sound mixer, performing the second delay processing on the second sound channel signal according to a relative position and outputting to the first sound mixer;

S30, after performing reverse operation to the second sound channel signal processed by the second delay, adding it to the first sound channel signal output to the first sound mixer to obtain a sound channel signal for driving the first loudspeaker; after performing reverse operation to the first sound channel signal processed by the second delay, adding it to the second sound channel signal output to the second sound mixer to obtain a sound channel signal for driving the second loudspeaker.

Further, as a preferred technical solution, in the step S10, the performing a first delay processing on a first sound channel signal and a second sound channel signal includes setting delay time of a first delay timer for the first loudspeaker and the second loudspeaker, respectively.

Further, as a preferred technical solution the delay time of the first delay timer for the first loudspeaker is calculated by using the following formula:

$$T11 = L/V + T21;$$

wherein $T11$ represents the delay time of the first delay timer of the first loudspeaker. $T21$ represents the delay time of the first delay timer of the second loudspeaker, and the unit is second (s); $L$ represents a difference between a direct sound path from the first sound channel signal and a direct sound path from the second sound channel signal to the driving seat and the unit is meter (m); $V$ represents a velocity of sound in air.

Further, as a preferred technical solution, the delay time $T21$ of the first delay timer for the second loudspeaker is set as 0.

Further, as a preferred technical solution, in the step S20, the performing second delay processing on a first sound channel signal and a second sound channel signal includes setting delay timer of a second delay timer for the first loudspeaker and the second loudspeaker, respectively.

Further, as a preferred technical solution, the delay time of the second delay timer for the first loudspeaker is calculated by using the following formula:

$$T12 = (Lr1 + Lr2 - Ld)/V;$$

wherein $T12$ represents the delay time of the second delay timer for the first loudspeaker, and the unit is second (s); $Lr1$ represents a first path of a reflection sound of the first sound channel signal; $Lr2$ represents a second path of a reflection sound of the first sound channel signal; $Ld$ represents a direct sound path of the first sound channel signal; $V$ represents a velocity of sound in air.

Further, as a preferred technical solution, the delay time of the second delay timer for the second loudspeaker is calculated by using the following formula:

$$T22 = (Rr1 + Rr2 - Rd)/V;$$

wherein $T22$ represents the delay tine of the second delay timer f r the second loudspeaker, the unit is second (s); $Rr1$ represents a first path of a reflection sound of the second sound channel signal; $Rr2$ represents a second path of a reflection sound of the second sound channel signal; $Rd$ represents a direct sound path of the second sound channel signal; $V$ represents a velocity of sound in air.

Further, as a preferred technical solution, in the step S20, before performing second delay processing on a first sound channel signal and a second sound channel signal, filtering processing should be performed, respectively.

Further, as a preferred technical solution the filtering processing includes using a filter to filter a low frequency signal that is not obvious in direction and a high frequency signal that are not sensitive to phase.

Further, as a preferred technical solution, the first loudspeaker is a left loudspeaker and the second loudspeaker is a right loudspeaker.

Compared with the prior art, the technical solution of the present invention has the following beneficial effects:

In the present invention, by performing delay processing on sound channel signals in a loudspeaker twice to counteract signals reflected by door glass, the sound field performs better. Using the sound field processing method of the present invention may enable the sound field of sounds heard by the driver to be centered and the diffusion of both sides to be symmetric. Also, the sound field can be expanded to the outside of the vehicle, resolving the problem that the car audio, in a car environment, has a sound field weighted toward one side, has a narrow sound field width, and has poor hearing effects due to the confined sound field. The invention enables sound heard to be authentic rather than empty.

Figure 1:
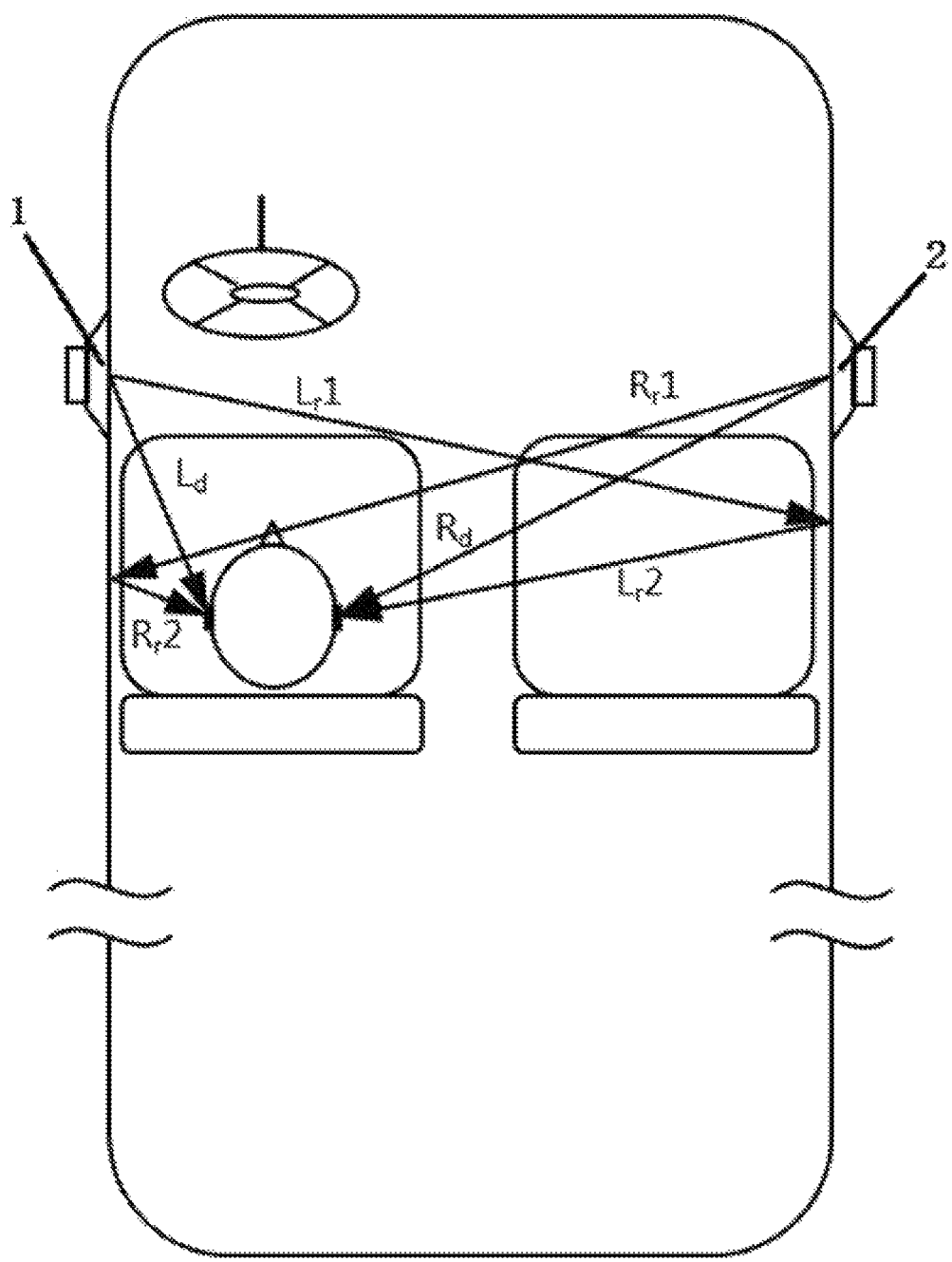
FIG. 1 is a view showing the acoustic propagation path from the sound of the loudspeaker of the present invention to the driver's ears.

Among them, first loudspeaker is 1, first amplifier is 11, first delay timer of first loudspeaker is 12, first filter is 13, second delay timer of first loudspeaker is 14, first mixer is 15, second loudspeaker is 2, second amplifier is 21, first delay timer of second loudspeaker is 22, second filter is 23, second delay timer of second loudspeaker is 24, and second mixer is 25.

The accompanying drawings are merely for exemplary description and cannot be understood as limits to the present invention. In order to better describe an embodiment, some components in the drawings may be omitted, amplified or zoomed out and do not represent the size of an actual product. For a person skilled in the art, it may be understandable that some well-known structures and descriptions may be omitted in the drawings. Same or similar numerals correspond to same or similar components. Terms for describing a positional relationship in the drawings are merely for exemplary description and cannot be understood as limits to the present invention.

DETAILED DESCRIPTION OF THE INVENTION

The preferred embodiments of the present invention are described in detail below with reference to the accompanying drawings, in which the advantages and features of the invention are more readily understood by those skilled in the art, so as to clearly define the protection scope of the present invention.

Embodiment 1

Figure 2:
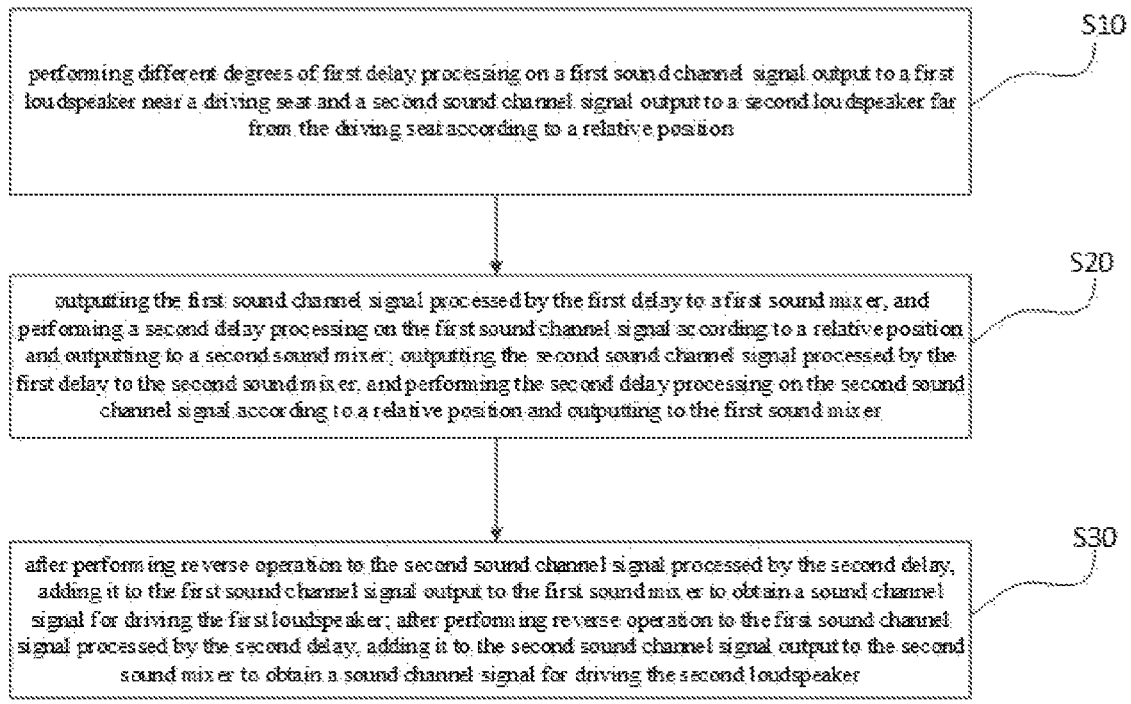
FIG. 2 is a flow chart of the processing steps of the car stereo audio expanding method of the present invention.
Figure 3:
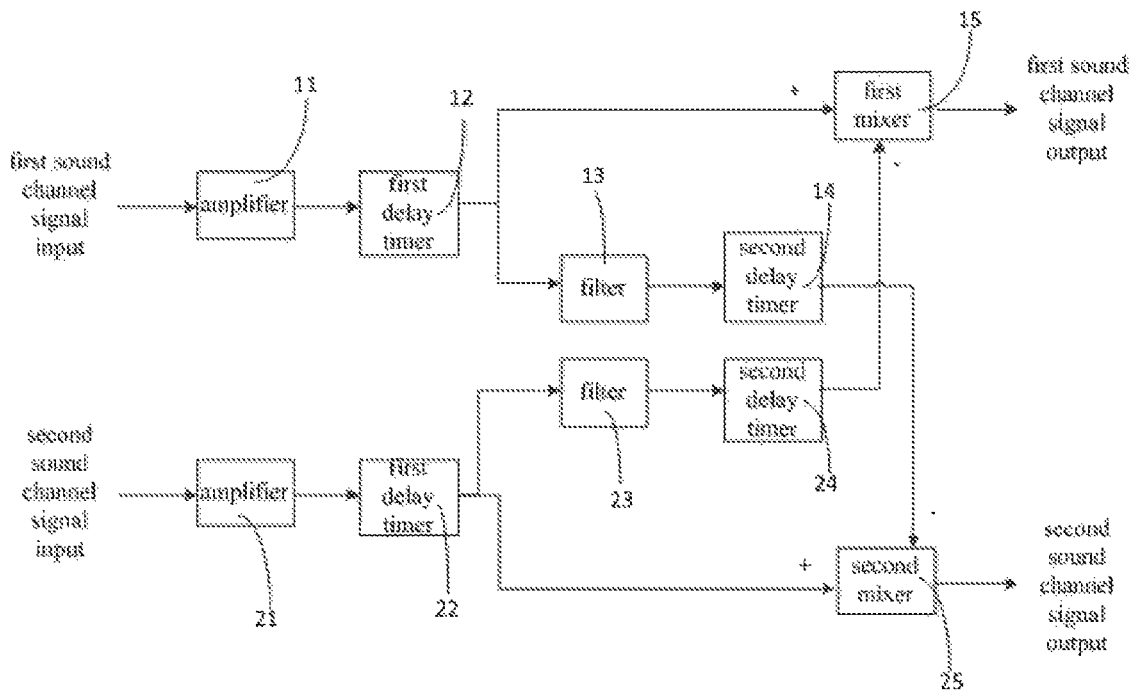
FIG. 3 is a schematic view of the car stereo audio expanding method of the present invention.

As shown in FIGS. 1 to 3, a pair of loudspeakers is disposed on both sides of the car, wherein the first loudspeaker 1 is close to the driving position, and the second loudspeaker 2 is away from the driving position. Since the distance between the first loudspeaker 1 and the driving position is different from the distance between the second loudspeaker 2 and the driving position, the listening angles of the left and right sides are different by several times. And since there are many glass windows and the hardness of the glass is large, the sound is almost totally reflected, and the reflected sound is strong, so that the display of the sound field is affected. In the present invention, by performing delay processing on sound channel signals in a loudspeaker twice to counteract signals reflected by door glass, the sound field performs better.

Specifically, the method comprises the following steps:

S10, performing different degrees of first delay processing on a first sound channel signal output to a first loudspeaker 1 near a driving seat and a second sound channel signal output to a second loudspeaker 2 far from the driving seat according to a relative position.

Among them, the relative position indicates the distance between the loudspeaker and the driving position, the loudspeaker closer to the driving position is defined as the first speaker 1, and the loudspeaker farther from the driving position is defined as the second speaker 2, and the first loudspeaker 1 has one and the second loudspeaker 2 has at least one. The expression "different degrees" indicates that the delay time of the second sound channel signal of the second loudspeaker 2 farther from the driving position is different from the delay time of the first sound channel signal of the first loud speaker 1 closer to the driving position, so delay processing should be performed accordingly.

The performing a first delay processing on a first sound channel signal and a second sound channel signal specifically includes setting delay time of a first delay timer 12 for the first loudspeaker 1 and a first delay timer 22 for the second loudspeaker 2, respectively.

The delay time of the first delay timer 12 for the first loudspeaker is calculated by using the following formula:

$$T11 = L/V + T21;$$

wherein T11 represents the delay time of the first delay timer of the first loudspeaker, T21 represents the delay time of the first delay timer of the second loudspeaker, and the unit is second (s); L represents a difference between a direct sound path from the first sound channel signal and a direct sound path from the second sound channel signal to the driving seat, and the unit is meter (m); V represents a velocity of sound in air.

The delay time T21 of the first delay timer 22 for the second loudspeaker 2 is set as 0.

In this step, the delay time T21 of the first delay timer 22 for the second loudspeaker 2 farther from the driving position is set to 0, and the delay time T11 of the first delay timer 12 for the first loudspeaker 1 closer to the driver's seat is set according to the formula. In actual operation, it is necessary to fine-tune the actual car, which is subject to actual adjustment.

S20, outputting the first sound channel signal processed by the first delay to a first sound mixer 15, and performing a second delay processing on the first sound channel signal according to a relative position and outputting to a second sound mixer 25; outputting the second sound channel signal processed by the first delay to the second sound mixer 25, and performing the second delay processing on the second sound channel signal according to a relative position and outputting to the first sound mixer 15.

The performing a second delay processing on a first sound channel signal and a second sound channel signal includes setting delay time of a second delay timer 14 for the first loudspeaker and a second delay timer 24 for the second loudspeaker, respectively.

The delay time of the second delay timer 14 for the first loudspeaker is calculated by using the following formula:

$$T12=(Lr1+Lr2-Ld)/V;$$

wherein T12 represents the delay time of the second delay timer for the first loudspeaker, and the unit is second (s): Lr1 represents a first path of a reflection sound of the first sound channel signal; Lr2 represents a second path of a reflection sound of the first sound channel signal; Ld represents a direct sound path of the first sound channel signal; V represents a velocity of sound in air.

The delay time of the second delay timer 24 for the second loudspeaker is calculated by using the following formula:

$$T22=(Rr1+Rr2-Rd)/V;$$

wherein T22 represents the delay the of the second delay timer for the second loudspeaker, the unit is second (s): Rr1 represents a first path of a reflection sound of the second sound channel signal; Rr2 represents a second path of a reflection sound of the second sound channel signal; Rd represents a direct sound path of the second sound channel signal; V represents a velocity of sound in air.

In this step, before performing second delay processing on a first sound channel signal and a second sound channel signal, filtering processing should be performed, respectively; the filtering processing includes using a filter to filter a low frequency signal that is not obvious in direction and a high frequency signal that are not sensitive to phase.

In this step, a first sound channel signal of the first loudspeaker 1 passes through the first amplifier 11 and the first delay timer 12 for the first loudspeaker to be divided into two signals, wherein one signal of the first sound channel signal is directly output to the first mixer 15, and the other signal is filtered by the first filter 13 and then passed through the second delay timer 14 of the first loudspeaker to be output to the second mixer 25. At the same time, a second sound channel signal of the second loudspeaker 2 passes through the second amplifier 21 and the first delay timer 22 for the second loudspeaker to be divided into two signals, wherein one signal of the second sound channel signal is directly output to the second mixer 25, and the other signal is filtered by the second filter 23 and then passed through the second delay timer 24 of the second loudspeaker to be output to the first mixer 15.

S30, after performing reverse operation to the second sound channel signal processed by the second delay, adding it to the first sound channel signal output to the first sound mixer 15 to obtain a sound channel signal for driving the first loudspeaker 1; after performing reverse operation to the first sound channel signal processed by the second delay, adding it to the second sound channel signal output to the second sound mixer 25 to obtain a sound channel signal for driving the second loudspeaker 2.

In this step, what is output to the first mixer 15 is a signal obtained by subtracting the second sound channel signal from the direct-reaching first sound channel signal and performing the second delay process, and the output of the first loudspeaker 1 includes an inverted signal after the filtering delay of the second sound channel signal, which counteracts the second sound channel signal reflected from the car to the left side of the driver. Similarly, what is output to the second mixer 25 is a signal obtained by subtracting the first sound channel signal from the direct-reaching second sound channel signal and performing the second delay process, and the output of the second loudspeaker 2 includes an inverted signal after the filtering delay of the first sound channel signal, which counteracts the first sound channel signal reflected from the car to the right side of the driver After such processing, the sound field of the stereo may be well expanded, and it is a real sound field without illusory feeling.

In the present technical solution, the first loudspeaker 1 is a left loudspeaker, and the second loudspeaker 2 is a right loudspeaker; the first sound channel signal is a left sound channel signal, and the second sound channel signal is a right sound channel signal; the first amplifier 11 is a left amplifier, and the second amplifier 21 is a right amplifier; the first filter 13 is a left filter, and the second filter 23 is a right filter; the first mixer 15 is a left mixer, and the second mixer 25 is a right mixer.

In the present invention, by performing delay processing on sound channel signals in a loudspeaker twice to counteract signals reflected by door glass, the sound field performs better. Using the sound field processing method of the present invention may enable the sound field of sounds heard by the driver to be centered and the diffusion of both sides to be symmetric. Also, the sound field can be expanded to the outside of the vehicle, resolving the problem that the car audio, in a car environment, has a sound field weighted toward one side, has a narrow sound field width, and has poor hearing effects due to the confined sound field. The invention enables sound heard to be authentic rather than empty.

In the technical solution claimed by the present invention, the first loudspeaker is the loudspeaker closest to the driving position, and the second loudspeaker is farther away from the driving position than the first loudspeaker; and the second loudspeaker is not limited to one, but may be multiple, and the delay time of the plurality of second loudspeakers is set with the delay time of the first loudspeaker; the first loudspeaker and the second loudspeaker may be disposed on either the front side of the car or the rear side of the car. The position is not limited to the relative position in the present embodiment.

It is apparent that the above-described embodiments of the present invention are merely illustrative of the present invention and are not intended to limit the embodiments of the present invention. Other variations or modifications of the various forms may be made by those skilled in the art in light of the above description. There is no need and no way to exhaust all of the implementations. Any modifications, equivalent substitutions and improvements made within the spirit and scope of the invention are intended to be included within the scope of the appended claims.

What is claimed is:

1. A car stereo audio expanding method, comprising steps of:
   S10, performing different degrees of first delay processing on a first sound channel signal output to a first loudspeaker near a driving seat and a second sound channel signal output to a second loudspeaker far from the driving seat according to a relative position;
   S20, outputting the first sound channel signal processed by the first delay to a first sound mixer, and performing a second delay processing on the first sound channel signal according to a relative position and outputting to a second sound mixer; outputting the second sound channel signal processed by the first delay to the second sound mixer, and performing the second delay processing on the second sound channel signal according to a relative position and outputting to the first sound mixer;

S30, after performing reverse operation to the second sound channel signal processed by the second delay, adding it to the first sound channel signal output to the first sound mixer to obtain a sound channel signal for driving the first loudspeaker; after performing reverse operation to the first sound channel signal processed by the second delay, adding it to the second sound channel signal output to the second sound mixer to obtain a sound channel signal for driving the second loudspeaker.

2. The car stereo audio expanding method according to claim 1, characterized in that in the step S10, the performing a first delay processing on a first sound channel signal and a second sound channel signal includes setting delay time of a first delay timer for the first loudspeaker and the second loudspeaker, respectively.

3. The car stereo audio expanding method according to claim 2, characterized in that the delay time of the first delayer of the first loudspeaker is calculated by using the following formula:

$$T11=L/V+T21;$$

wherein T11 represents the delay time of the first delay timer of the first loudspeaker, T21 represents the delay time of the first delay timer of the second loudspeaker, and the unit is second (s); L represents a difference between a direct sound path from the first sound channel signal and a direct sound path from the second sound channel signal to the driving seat, and the unit is meter (m); V represents a velocity of sound in air.

4. The car stereo audio expanding method according to claim 2, characterized by setting the delay time T21 of the first delay timer for the second loudspeaker as 0.

5. The car stereo audio expanding method according to claim 3, characterized by setting the delay time T21 of the first delay timer for the second loudspeaker as 0.

6. The car stereo audio expanding method according to claim 1, characterized in that in the step S20, the performing second delay processing on a first sound channel signal and a second sound channel signal includes setting delay timer of a second delay timer for the first loudspeaker and the second loudspeaker, respectively.

7. The car stereo audio expanding method according to claim 6, characterized in that the delay time of the second delay timer for the first loudspeaker is calculated by using the following formula:

$$T12=(Lr1+Lr2-Ld)/V;$$

wherein T12 represents the delay time of the second delay timer for the first loudspeaker, and the unit is second (s); Lr1 represents a first path of a reflection sound of the first sound channel signal; Lr2 represents a second path of a reflection sound of the first sound channel signal; Ld represents a direct sound path of the first sound channel signal; V represents a velocity of sound in air.

8. The car stereo audio expanding method according to claim 6, characterized in that the delay time of the second delay timer for the second loudspeaker is calculated by using the following formula:

$$T22=(Rr1+Rr2-Rd)/V;$$

wherein T22 represents the delay time of the second delay timer for the second loudspeaker, the unit is second (s); Rr1 represents a first path of a reflection sound of the second sound channel signal; Rr2 represents a second path of a reflection sound of the second sound channel signal; Rd represents a direct sound path of the second sound channel signal; V represents a velocity of sound in air.

9. The car stereo audio expanding method according to claim 1, characterized in that in the step S20, before performing second delay processing on a first sound channel signal and a second sound channel signal, filtering processing should be performed, respectively.

10. The car stereo audio expanding method according to claim 9, characterized in that the filtering processing includes using a filter to filter a low frequency signal that is not obvious in direction and a high frequency signal that are not sensitive to phase.

11. The car stereo audio expanding method according to claim 1, characterized in that the first loudspeaker is a left loudspeaker and the second loudspeaker is a right loudspeaker.

* * * * *